July 23, 1968
W. E. MONROE
3,393,513
FLUID PRESSURE SERVOMOTOR
Filed June 27, 1966
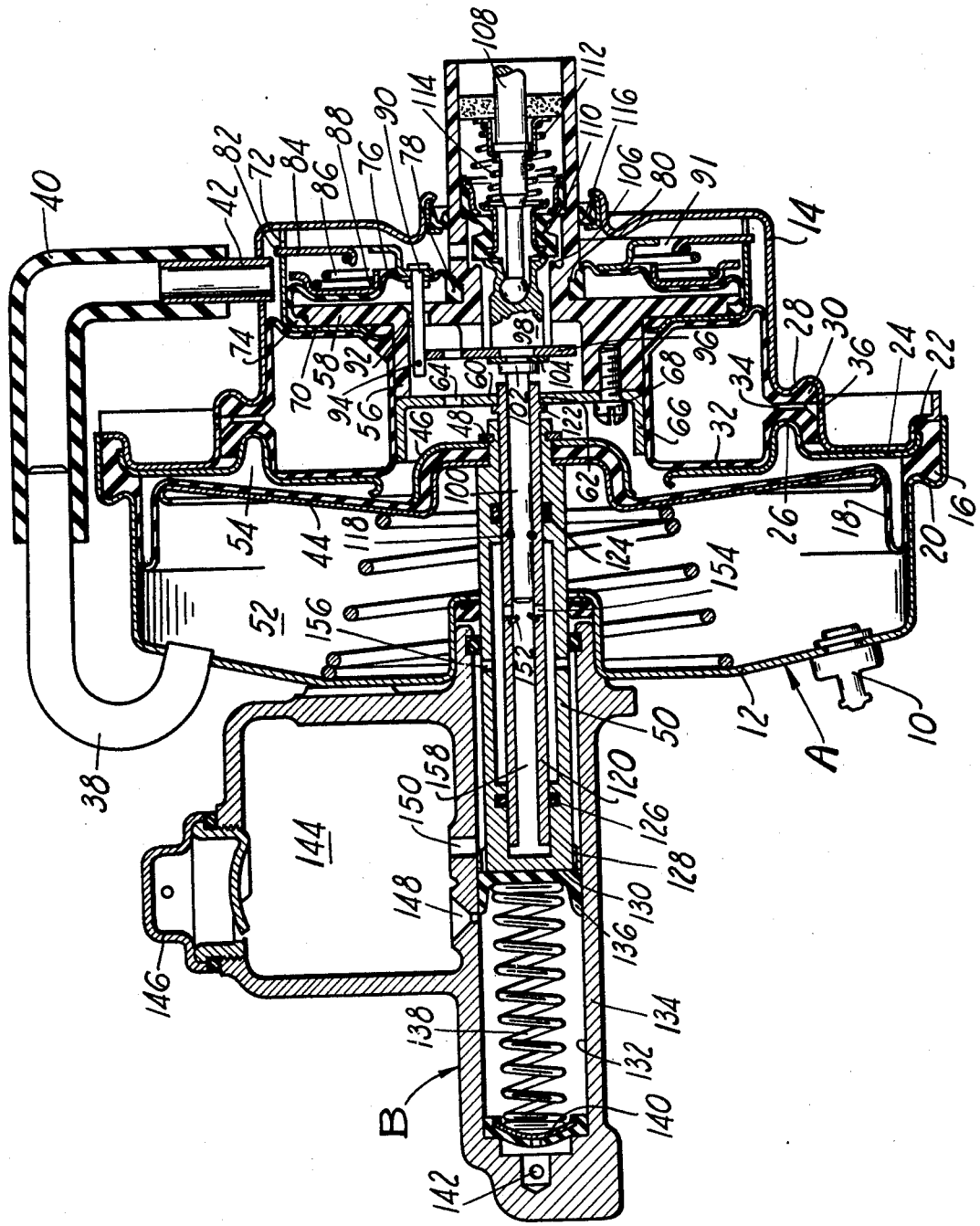
INVENTOR.
WILLIAM E. MONROE
BY
Richard G. Geib
ATTORNEY United States Patent Office 3,393,513
Patented July 23, 1968

3,393,513
FLUID PRESSURE SERVOMOTOR
William E. Monroe, Oak Park, Mich., assignor to The Bendix Corporation, a corporation of Delaware
Filed June 27, 1966, Ser. No. 560,530
9 Claims. (Cl. 60—54.6)

ABSTRACT OF THE DISCLOSURE

A servomotor having a force transmitting rod comprised of elements adapted to create a hydraulic link between the boost members and the driven members of the servomotor that will permit direct transition from boost control of the driven members to manual control of the driven members.

---

This invention relates to improvements in fluid pressure servomotors. More particularly, the invention is concerned with a means to provide a positive connection between a fluid pressure servomotor and a hydraulic actuating cylinder.

The prior art is repleat with various devices for providing a working hydraulic pressure by way of utilizing a differential pressure across a movable wall type fluid pressure motor. In recent years and particularly with regard to vehicle braking systems utilizing such mechanisms, it has been the desire of vehicle manufacturers to provide a power braking system whereby the control operation therefor requires minimum valve travel. This desire is predicated upon the theory of equalizing brake pedal height and accelerator pedal height to decrease the reaction time in operating the brakes in a case of emergency. In these constructions there has been experienced a lost motion between manual application of the brakes in the event of power failure or power run-out, the latter condition being where the fluid pressure motor has developed the maximum force that can be obtained and further force must be developed by manual means.

It is a principal object of this invention to eliminate any lost motion in transition from power to manual operation of such servomotors.

It is a further object of this invention to provide a connection between a fluid pressure servomotor and a hydraulic actuating means, such as a master cylinder, which will at all times be a positive connection between the control valve for the servomotor and the master cylinder.

A still further object of this invention is to provide a connection of the aforementioned type whereby hydraulic pressure is trapped to create a hydraulic column or link between the control valve for the servomotor and a piston within the hydraulic actuating means or master cylinder.

Other objects and advantages of this invetnion will appear to those skilled in the art to which the invention relates from the following description of the drawing showing a hydraulic pressure generating means in cross section that embodies the principles of the invention.

With regard to the drawing, there is shown a fluid pressure servomotor A arranged to operate a hydraulic actuating means or master cylinder B. More particularly, the servomotor is of a vacuum suspended type having an inlet which is communicated via a check valve 10 to a vacuum source (not shown); i.e., an intake manfold of an automobile engine within a forward shell 12 of the servomotor. To the forward shell a cover plate or rear shell 14 is affixed as by a twist lock type of connection with a peripheral bead 16 of a diaphragm 18 between appropriately formed flanges 20 and 22 of the front shell 12 and the rear shell 14, respectively, to seal the connection. This connection also supports a radially depending plate 24 formed with a shoulder 26 that cooperates with an inwardly turned portion 28 of the rear shell 14 to compress a bead 30 of a donut shaped diaphragm 32 therebetween. The donut shaped diaphragm is provided with radial openings 34 that communicate with openings 36 in the rear shell 14 so that atmosphere may be introduced to the interior of the diaphragm 32. A tube 38 is connected through an opening in the front shell 12 to a hose 40 that is also connected to a tube 42 extending from an opening in the rear shell 14 to provide a fluid passageway from the front to the rear of the servomotor.

A diaphragm 18 is held to a supporting plate 44 by means of a diaphragm retainer 46 and a snap ring 48 on a tubular structure 50. Thus, the diaphragm 18 and plate 44 divide the interior of the servomotor A into a supply chamber 52 and a control chamber 54. As seen, the donut diaphragm 32 is located within the control chamber in the rear shell 14. A plastic sleeve 56 having radial flanges 58 is joined to the donut diaphragm 32 through the central opening in that the exterior diameter of the sleeve 56 is greater than the interior diameter of the donut diaphragm 32, so that friction created by the interference fit will maintain the diaphragm and sleeve in their relative positions shown. A metal plate 60 having a central opening 62 and equi-spaced radial openings 64 is formed with a forwardly turned flange 66 and joined by means of a bolt 68 to the plastic sleeve 56 to further enhance the connection of the donut diaphragm 32 to the plastic sleeve 56. A plate 70 is inserted between the radial flange 58 and the diaphragm 32 and has rearwardly extending portions 72 contacting the rear shell 14. This plate in passing around the radial flange 58 locates a bead 74 of a reaction diaphragm 76 that is mounted interiorly as by another bead 78 to a control boss 80 of the plastic sleeve 56. The rearward legs 72 of the plate 70 are provided with a number of openings adjacent the contact with the rear shell 14 which receive fingers 82 of a spring bearing plate 84 for compressing a spring 86 between the plate 84 and another plate 88 resting on the reaction diaphragm 76. A guide pin 90 is utilized to clamp the plate 84 to the reaction diaphragm adjacent its bead 78, and openings 91 are stamped through the plate 84 to provide fluid communication to the rear side of the reaction diaphragm 76.

The plastic sleeve 56 is provided with an opening 92 through which the guide pin 90 projects and through which the forward face of the reaction diaphragm 76 is communicated to pressure within the control chamber 54. In view of the use of the tube 38, hose 40 and tube 42, this would mean that the rear face of the diaphragm is subjected to pressure in the supply chamber 52 and the forward face is subjected to the control pressure, as aforementioned. The guide pin 90 is provided with a transverse pin 94 that is arranged to contact a reaction transmitting plate 96 that, in the released position shown, abuts on the inner structure of the plastic sleeve 56. The plate 96 is provided with a central opening that fits about a reduced portion of a valve plunger 98 having a forwardly projecting rod 100 of still further reduced cross section. A flange 102 is formed on the rod adjacent the reduced portion and a retainer ring 104 unites the plate 96 to the control plunger 98. As seen, the control plunger 98 is formed at its rearward end with a valve seat 106 and is connected by a ball and socket type connection to a push rod 108 for operating same. The boss 80 is provided with a stepped bore and a rubber poppet 110 is seated thereagainst. This poppet is provided with metal reinforcing plates, one of which serves to provide a bearing for a valve return spring 112, and the other of which provides a bearing for a valve follow-up spring 114 compressed between the push rod 108 and the metal reinforcing plates. As seen, the boss 80 projects through an opening in the rear shell 14 which is sealed by means of a double lip seal 116 of rubber construction.

The rod or piston 100, as it may be termed, is grooved to allow the installation thereto of an O-ring seal 118 to sealingly fit said rod within a cylinder 120 having a flange 122 bearing against the plate 60 about the central opening 62 therethrough. A cylinder 120 is sealingly mounted for reciprocation within the tubular structure 50 by the seals 124 and 126.

The tubular structure 50 is closed at its extreme forward end about the cylinder 120. A piston face 130 is formed thereon and a plurality of axial passages 128 communicate one side of the face to the other. The piston face 130 is slidably mounted within a bore 132 of a cast master cylinder or actuating cylinder housing 134, a cup-shaped piston seal 136 is held against the piston face 130 by means of a return spring 138 within the bore 132. The other end of the return spring 138 bears against a residual pressure check valve 140 adjacent the outlet 142 of the master cylinder B. The master cylinder B is also formed with a reservoir 144 for hydraulic fluid which is closed by means of a threaded cap 146. The master cylinder is held to the forward shell 12 of the servomotor by means of bolts (not shown). Before passing on to the operation, it should be noted that the reservoir 144 is provided with a small replenishing passage 148 into the bore 132 that in the normal position of the cup-shaped seal 136 is positioned to have its rear edge adjacent the forwardmost edge of the seal, and another larger replenishing passage 150 is drilled through the reservoir into the bore behind the piston face 130.

It will be realized by those skilled in the art to which the invention relates that the push rod 108 is connected to a brake pedal within an associated vehicle and the master cylinder outlet 142 is connected to the wheel cylinders of the brakes for the vehicle; whereas the vacuum inlet 10 is provided with a vacuum check valve and communicated to the intake manifold for the engine of the vehicle.

In operation, when the brake pedal is depressed, the push rod 108 is moved inwardly to seat the poppet 110 upon the seat in the boss 80 and remove the seat 106 from the poppet to allow atmospheric air pressure which is introduced around the push rod 108 through the filter shown to enter the control chamber 54. As vacuum, via inlet 10, is within the supply chamber 52 and the rear shell section 14 behind the diaphragm 32, the movable wall formed on the diaphragm 18 and the plate 44 will be projected forwardly and the plastic sleeve 56 will be maintained in its attitude shown.

The initial movement of the push rod 108 will translate the rod 100 to seat upon a rubber valve 152 within the cylinder 120 to trap hydraulic fluid ahead of the radial replenishing passageway 154 that is communicated to the master cylinder reservoir 144 via a radial passageway 156 in the tubular structure 50 and the replenishing passageway 150. Then as the movable wall 18, 44 is translated, the tubular structure 50 will enlarge the chamber 158 ahead of the rubber valve 152 so that portions of the rubber valve 152 will be deflected forwardly to allow the induction of hydraulic fluid to the chamber 158. At the same time the piston 130 is translating the cup-shaped seal 136 to pressurize hydraulic fluid in the bore 132 after the lip of the seal 136 passes over the replenishing opening 148 to seal the chamber 132.

In the event the pressure differential across the movable wall 18, 44 is not sufficient to provide adequate pressurization of the fluid within the bore 132 ahead of the piston 130, physical force on the push rod 108 will be applied via the flange 102 to the cylinder 120. As a hydraulic column is trapped within the chamber 158, this physical force will then be directly transmitted to the tubular structure 50 to continue movement of the piston 130 in the bore 132.

It should be noted that as the control chamber 54 is essentially being pressurized by atmospheric air that when the pressure in chamber 54 begins to equalize with that within the hollow donut diaphragm 32, that the boss 80 and push rod 108 will be allowed to move inwardly. Until that time their relative position will remain generally that as shown. As the control pressure in chamber 54 is on one side of the diaphragm 76 with vacuum on the other side, the diaphragm 76 will provide a reactionary force via the pin 90 and plate 96 on the control plunger 98 and thence to the push rod 108 providing the operator of the brake pedal with a feel sensation.

Having fully described the construction and operation of the invention with regard to one of many usages for the principles of the invention, it is now desired to set forth the scope of protection sought by these Letters Patent in the appended claims.

I claim:
1. A hydraulic pressure generating means comprising:
  a fluid pressure servomotor including an operator-operated control means within a movable wall;
  a hydraulic actuator adapted to said servomotor, which actuator comprises a reservoir for fluid and a first piston connected by a tubular structure to said movable wall; and
  a hydraulic link means comprising a cylinder within said tubular structure affixed to said control means and a second piston reciprocable within said cylinder, said second piston and cylinder connecting said control means, said movable wall and said first piston such that a chamber in said cylinder provides an expanding hydraulic link controlled so as to have fluid drawn therein during expansion and thereafter trapped between said control means and said first piston.

2. A hydraulic pressure generating means according to claim 1 wherein said control means is in said servomotor and includes a pressure responsive means to limit travel thereof so long as power is available for said movable wall.

3. A hydraulic pressure generating means according to claim 2 wherein said hydraulic actuator includes a hydraulic reservoir and fluid passages from same to within said chamber of said hydraulic link means via said tubular structure.

4. A hydraulic pressure generating means according to claim 3 wherein said hydraulic link means includes:
  a cylinder connected to said pressure responsive means telescopically arranged within said tubular structure, said cylinder having a passageway thereinto from a cavity formed between the cylinder and said tubular structure with a valve means in said cylinder adjacent a forward edge of said passageway; and
  a second piston within said cylinder connected to said control means to be reciprocable within said cylinder as said pressure responsive means is holding said cylinder, which second piston is connected to said control means and normally arranged to have its forward face adjacent the rearward edge of said passageway such that movement of said control means to operate said movable wall will cause said second piston to actuate said valve means controlling the communication of a chamber within said cylinder ahead of said second piston with said cavity creating an expandable hydraulic chamber connecting said control means and said second piston.

5. A hydraulic pressure generating means according to claim 4 wherein said piston is a rod affixed to a control valve plunger within said control means, said rod having a flange for abutting with said cylinder that is operatively connected to said pressure responsive means such that said control plunger movement causes said rod to actuate said valve and abut with said pressure responsive means to thereafter limit the force on said valve by transferring it to said cylinder.

6. In combination, a fluid pressure servomotor having a control means and a movable wall, a hydraulic actuator having a piston and a means to operatively connect same, said means comprising:
   a rod connected to said control means;
   a first cylinder about said rod and connected to said control means;
   a second cylinder about said first cylinder and connected to said movable wall and said piston; and
   means within said first cylinder operatively related to said rod to confine and permit replenishment of hydraulic fluid between said rod and said cylinders to create an expandable hydraulic link between said control means and said piston which will prevent lost motion in non-power actuation of said piston.

7. In the combination according to claim 6 and further comprising a hydraulic reservoir of fluid connected by passageways in said actuator to the area in said actuator ahead and behind said piston.

8. In the combination according to claim 7 and further comprising fluid passageways communicating said first cylinder with said reservoir.

9. In the combination according to claim 8 where said means to trap hydraulic fluid includes a valve operatively arranged to be closed by said rod, said valve being a flexible member which will in association with said rod prevent reverse flow and permit replenishing flow into said cylinder as said piston is moved to increase the volume in said first cylinder.

References Cited
UNITED STATES PATENTS 2,136,318   11/1938   Rossmann _____ 60—54.6 XR
2,593,394   4/1952    Rockwell _____ 60—54.5

MARTIN P. SCHWADRON, *Primary Examiner.*

ROBERT R. BUNEVICH, *Assistant Examiner.*